(12) United States Patent
Puranik et al.

(10) Patent No.: US 11,917,656 B2
(45) Date of Patent: Feb. 27, 2024

(54) BAND STEERING OF MULTI-BAND WIRELESS CLIENTS

(71) Applicant: NXP USA, Inc., Austin, TX (US)

(72) Inventors: Devidas Anant Puranik, Pune (IN); Anup Ramesh Kulkarni, Santa Clara, CA (US); Sachin Sudhakar Patki, Pune (IN); Amey Bhagwat, Pune (IN); Mahesh More, Pune (IN)

(73) Assignee: NXP USA, Inc., Austin, TX (US)

( * ) Notice: Subject to any disclaimer, the term of this patent is extended or adjusted under 35 U.S.C. 154(b) by 176 days.

(21) Appl. No.: 16/818,705

(22) Filed: Mar. 13, 2020

(65) Prior Publication Data

US 2021/0289506 A1     Sep. 16, 2021

(51) Int. Cl.
*H04W 48/20* (2009.01)
*H04W 72/52* (2023.01)
*H04W 72/0453* (2023.01)

(52) U.S. Cl.
CPC ........... *H04W 72/52* (2023.01); *H04W 48/20* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 8,655,278 B2 | 2/2014 | Laroche et al. | |
| 8,687,512 B2 | 4/2014 | Iyer | |
| 10,499,282 B1* | 12/2019 | Kamath | H04B 1/0064 |
| 2009/0252097 A1 | 10/2009 | Iyer et al. | |
| 2011/0235591 A1 | 9/2011 | Iyer et al. | |
| 2012/0243474 A1* | 9/2012 | Iyer | H04W 12/122 370/328 |
| 2014/0307707 A1* | 10/2014 | Mestanov | H04W 36/0066 370/331 |
| 2014/0370826 A1* | 12/2014 | Amini | H04W 24/02 455/78 |
| 2017/0019865 A1* | 1/2017 | Wang | H04W 52/241 |

(Continued)

OTHER PUBLICATIONS

Nakamae, Keiko, JP 2018148279 Translation, Sep. 20, 2018 (Year: 2018).*

(Continued)

*Primary Examiner* — Jenkey Van

(57) ABSTRACT

An access point device operable in a wireless network detects multi-band capability of a wireless client based on a probe request received from the wireless client on the non-preferred communication band. The multi-band capability is detected based on a set of parameters included in the received probe request. When the wireless client is detected to have the multi-band capability, the access point device blocks the attempt of the first wireless client to associate on the non-preferred communication band. The access point device allows the wireless client to associate on one of the non-preferred communication band and a preferred communication band based on a count of probe requests received by the access point device from the wireless client on the non-preferred communication band. Upon association on the non-preferred communication band, the access point device steers the associated wireless client to the preferred communication band.

17 Claims, 10 Drawing Sheets

(56) References Cited

U.S. PATENT DOCUMENTS

| | | | | |
|---|---|---|---|---|
| 2018/0077617 A1* | 3/2018 | Xue | ................... | G08G 5/0013 |
| 2018/0352493 A1* | 12/2018 | Strater | ................. | H04W 36/08 |
| 2019/0075469 A1* | 3/2019 | Mahoney | .............. | H04W 16/10 |
| 2019/0208464 A1* | 7/2019 | Lee | ...................... | H04W 48/16 |
| 2019/0380048 A1* | 12/2019 | Desai | ................... | H04L 41/082 |
| 2021/0329721 A1* | 10/2021 | Kim | ..................... | H04W 76/15 |
| 2021/0385712 A1* | 12/2021 | Acar | .................... | H04W 36/08 |

OTHER PUBLICATIONS

Fernandes, K. "Steer Clear of Legacy Band-steering and Not So Smart Antenna Beam-forming", ADTRAN, 7 pgs., retrieved from the internet Mar. 13, 2020 at: https://www.adtran.com/index.php/blog/302-steer-clear-of-legacy-bandsteering-and-not-so-smart-antenna-beamforming (Jan. 31, 2017).

\* cited by examiner

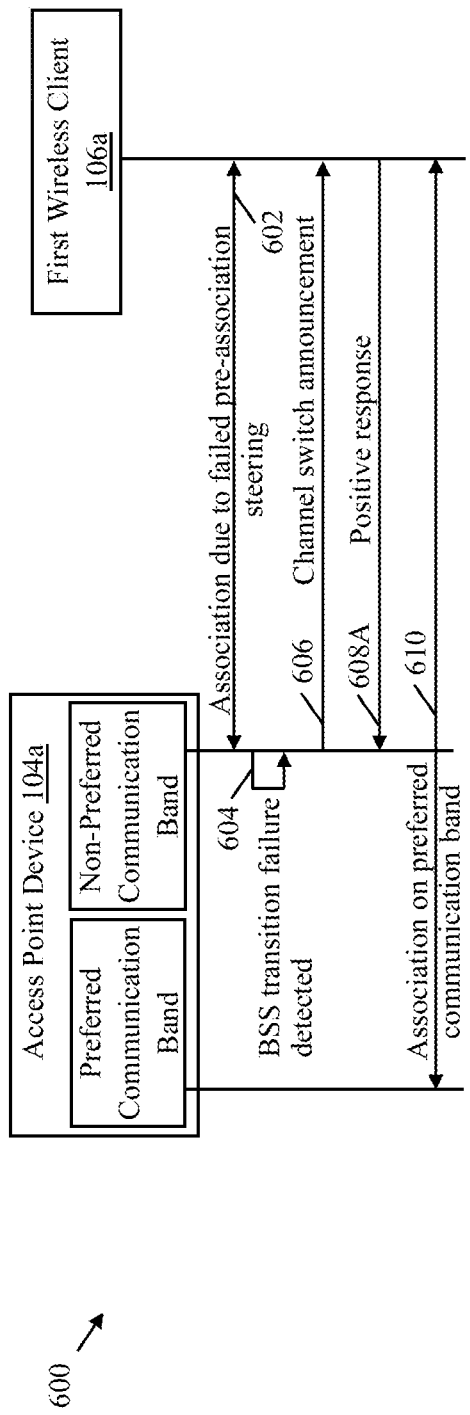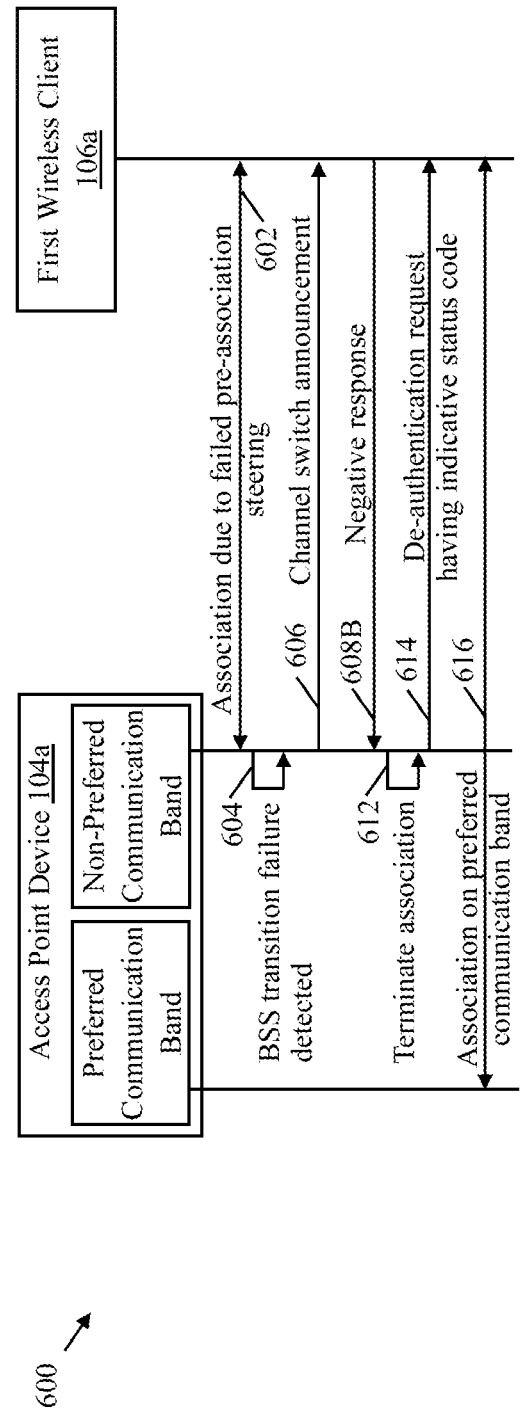

BAND STEERING OF MULTI-BAND WIRELESS CLIENTS

BACKGROUND

The present disclosure relates generally to wireless communication, and, more particularly, to band steering of multi-band wireless clients.

Advancements in wireless communication technology have led to the emergence of new communication standards, e.g., IEEE 802.11n, IEEE 802.11ac, or the like. Emergence of the new communication standards has led to an increase in the number of wireless clients connecting to wireless access point devices. Many wireless clients are capable of operating on multiple communication bands, such as 2.4 GHz (2G) and 5 GHz (5G) bands; however, there could be other wireless clients that are limited to single band operation, for example, 2G band only. Thus, with the increased number of different wireless clients connecting to an access point device, the access point device is required to manage its bandwidth efficiently. For bandwidth management, the access point device steers a connecting wireless client to a specific communication band, i.e., 2G band or 5G band. However, many a time, in an attempt to steer the wireless client to a specific communication band that is not preferred by the wireless client, the wireless client is denied connection to the access point device or undergoes a very slow initial association. Thus, there is a need for a technical solution that overcomes the aforementioned problems.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

FIG. 6A is a sequence diagram that illustrates band steering of a wireless client by the access point device of FIG. 1, in accordance with yet another embodiment of the present disclosure;

FIG. 6B is a sequence diagram that illustrates band steering of a wireless client by the access point device of FIG. 1, in accordance with yet another embodiment of the present disclosure;

DETAILED DESCRIPTION

Figure 1:
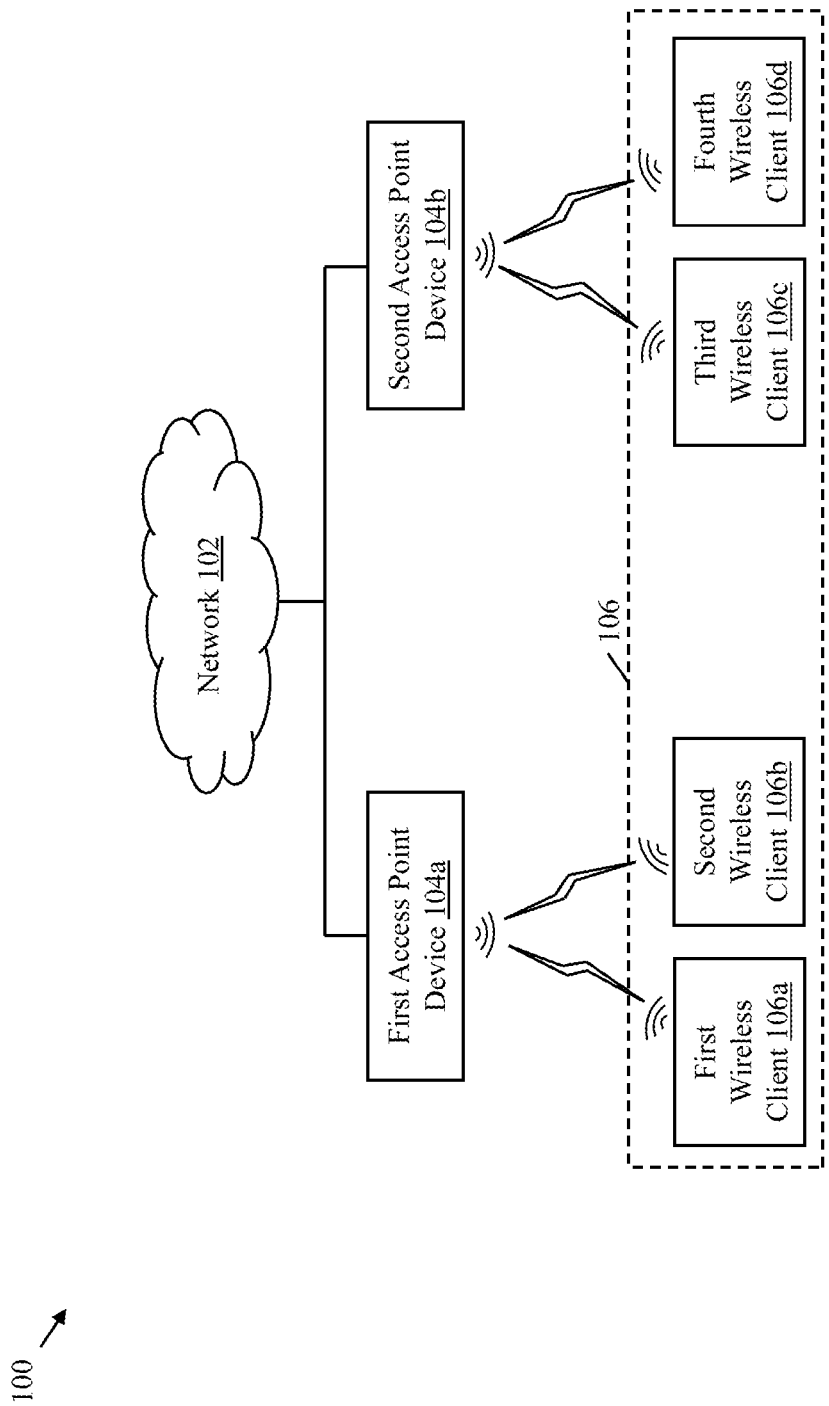
FIG. 1 is a schematic block diagram of an exemplary wireless network environment, in accordance with an embodiment of the present disclosure.

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

In one embodiment, the present disclosure provides an access point device that is operable in a wireless network and includes processing circuitry. The processing circuitry is configured to detect multi-band capability of a first wireless client that attempts to associate on a non-preferred communication band of the access point device by transmitting a first probe request to the access point device on the non-preferred communication band. The processing circuitry detects the multi-band capability of the first wireless client based on a set of parameters included in the first probe request. The processing circuitry is further configured to block the attempt of the first wireless client to associate on the non-preferred communication band based on the detected multi-band capability of the first wireless client. The processing circuitry is further configured to allow the first wireless client to associate with the access point device on one of the non-preferred communication band and a preferred communication band of the access point device based on a count of probe requests received by the processing circuitry from the first wireless client on the non-preferred communication band.

In another embodiment, the present disclosure provides a method for band steering in a wireless network. The method includes detecting, by an access point device, multi-band capability of a first wireless client that attempts to associate on a non-preferred communication band of the access point device by transmitting a first probe request to the access point device on the non-preferred communication band. The multi-band capability of the first wireless client is detected based on a set of parameters included in the first probe request. The method further includes blocking, by the access point device, the attempt of the first wireless client to associate on the non-preferred communication band based on the detected multi-band capability of the first wireless client. The method further includes allowing, by the access point device, the first wireless client to associate with the access point device on one of the non-preferred communication band and a preferred communication band of the access point device based on a count of probe requests received by the access point device from the first wireless client on the non-preferred communication band.

Various embodiments of the present disclosure provide an access point device that is operable in a wireless network. The access point device includes processing circuitry that is configured to receive from a wireless client, a probe request on a non-preferred communication band of the access point device. The processing circuitry is configured to detect multi-band capability of the wireless client based on a set of parameters included in the received probe request. When the wireless client is detected to have only single-band capability, the processing circuitry is configured to allow the wireless client to associate on the non-preferred communication band. However, when the wireless client is detected to have the multi-band capability, the processing circuitry is configured to implement pre-association steering and post-association steering to steer the wireless client to the preferred communication band. During pre-association steering, the processing circuitry is configured to block all attempts of the wireless client to associate on the non-preferred communication band, until a count of probe requests received by the processing circuitry from the first wireless client on the non-preferred communication band exceeds a threshold value. If the wireless client attempts to associate on the preferred communication band before the count of probe requests received on the non-preferred communication band exceeds the threshold value, the processing circuitry is configured to allow the wireless client to associate on the preferred communication band. However, when the count of probe requests from the wireless client on the non-preferred communication band exceeds the threshold value, the processing circuitry is configured to allow the wireless client to associate on the non-preferred communication band. Association of the wireless client on the non-preferred communication band indicates a pre-association steering failure. When pre-association steering fails and the wireless client associates on the non-preferred communication band, the processing circuitry is configured to implement the post-association steering using at least one of Basic Service Set (BSS) transition method, Extended Channel Switch Announcement (ECSA) method, and force re-connect method. Upon successful completion of the post-association steering, the wireless client is associated with the access point device on the preferred communication band.

As the processing circuitry detects multi-band capability of wireless clients before implementing band steering, single-band capable wireless clients do not experience delay in initial association due to band steering. Further, the processing circuitry only blocks a specific count of probe requests on the non-preferred communication band, after which the multi-band wireless client is allowed to associate on the non-preferred communication band. Thus, no wireless client is denied connection to the access point device due to continuous band steering. Upon association on the non-preferred communication band, the processing circuitry implements post-association steering to steer the multi-band wireless client to the preferred communication band, thereby efficiently managing its bandwidth.

Referring now to FIG. 1, a schematic block diagram of an exemplary wireless network environment 100, in accordance with an embodiment of the present disclosure is shown. The wireless network environment 100 includes a network 102, multiple access point devices (e.g., first and second access point devices 104a and 104b), and multiple wireless clients (e.g., first through fourth wireless clients 106a-106d). Hereinafter, the first through fourth wireless clients 106a-106d are collectively referred to as "the wireless clients 106".

The first access point device 104a is a physical network device that allows the wireless clients (e.g., the first and second wireless clients 106a and 106b) in the wireless network environment 100 to connect to the network 102. Examples of the network 102 include, but are not limited to, a local area network (LAN), a public network such as the Internet, a hybrid network such as a virtual private network (VPN), a public cloud, a private cloud, or a hybrid cloud.

The connection between the first access point device 104a and the network 102 may be wired or wireless. In one embodiment, the first access point device 104a may be connected to the network 102 by way of a router (not shown), a switch (not shown), a controller (not shown), or a combination thereof. The first access point device 104a includes hardware and software for transmitting and receiving wireless signals from the wireless clients 106.

The first access point device 104a supports communication on more than one communication bands, e.g., 2.4 GHz (2G) band and the 5 GHz (5G) band, and prefers one communication band for operation over other communication bands. For example, the first access point device 104a prefers 5G band over 2G band due to reduced channel interference on the 5G band. In another example, the 5G band may be overloaded and to balance load between the 5G and 2G bands, the first access point device 104a prefers 2G band over 5G band. Hereinafter, a communication band that is preferred by an access point device is referred to as "the preferred communication band" and other communication bands supported by the access point device are referred to as "the non-preferred communication bands".

Figure 7:
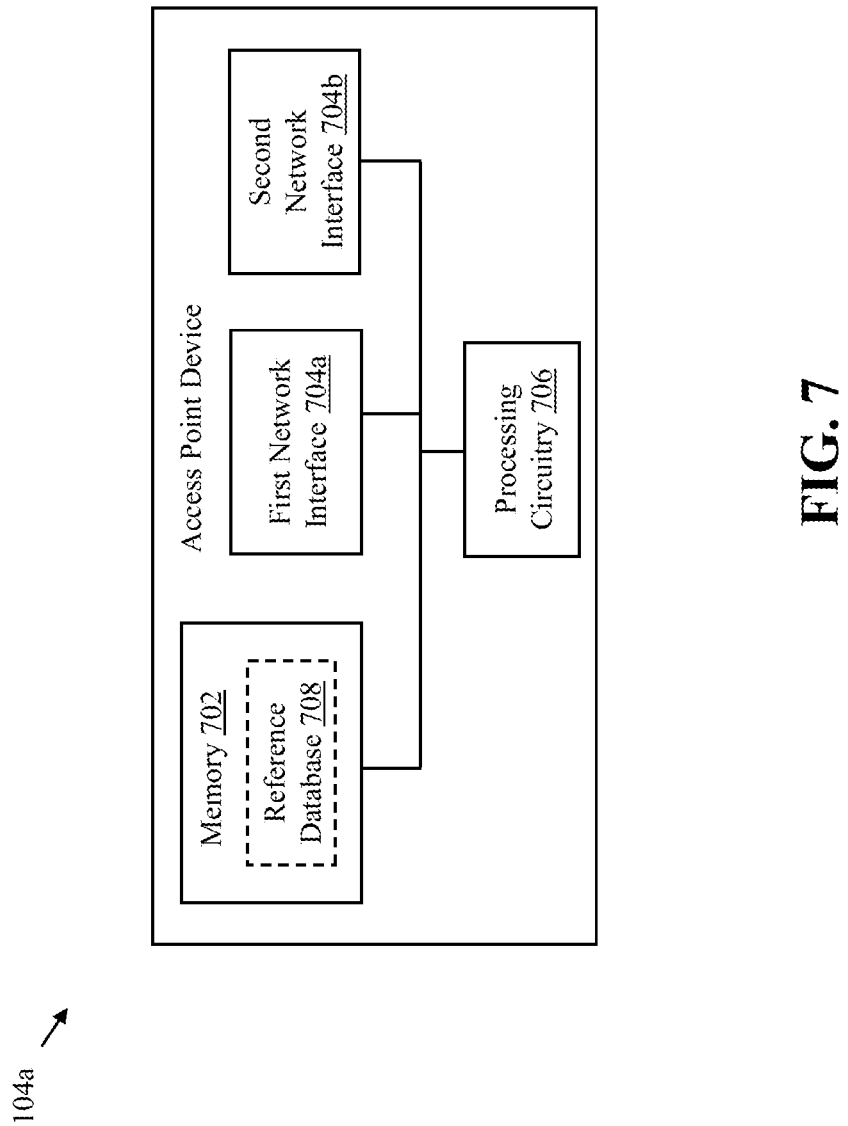
FIG. 7 is a schematic block diagram of the access point device of FIG. 1, in accordance with an embodiment of the present disclosure.

When a wireless client that supports operations on multiple communication bands (i.e., a multi-band wireless client) attempts to associate with the first access point device 104a, the first access point device 104a is configured to steer the multi-band wireless client to the preferred communication band. The first access point device 104a steers the multi-band wireless client by implementing pre-association steering and post-association steering. Pre-association steering is performed before the multi-band wireless client is associated with the first access point device 104a, and post-association steering is performed after the multi-band wireless client is associated with the first access point device 104a on the non-preferred communication band. The first access point device 104a is further configured to maintain a reference database (as shown in FIG. 7) therein. The reference database includes a record of various multi-band wireless clients that have previously connected to the first access point device 104a. The reference database may further include a record of various single band wireless clients that have previously connected to the first access point device 104a. The reference database is indicative of band capability of those wireless clients that have previously connected to the first access point device 104a. Various components of the first access point device 104a and their functionalities are explained in detail in conjunction with FIG. 7.

The second access point device 104b is structurally and functionally similar to the first access point device 104a and is shown to be wirelessly connected to the third and fourth wireless clients 106c and 106d. Examples of the first and second access point devices 104a and 104b include, but are not limited to, a wireless gateway, a cable modem, a wireless router, a mobile hot-spot router, a mobile phone having capability to create a hot-spot, a wireless range extender, a multimedia over coaxial alliance (MoCA) node, and any other device that is capable of wirelessly routing communications to and from the wireless clients 106.

The wireless clients 106 may include a variety of devices such as desktops, laptops, tablets, mobile phones, phablets, smart phones, televisions, set-top boxes, or other Internet of things (IoT) based devices. Each wireless client 106 may be a multi-band capable device that operates on multiple communication bands (e.g., 2G and 5G bands) or a single-band capable device that operates on a single communication band. Each wireless client 106 is associated with one access point device (e.g., the first or second access point device 104a or 104b), and transmits and receives messages within the wireless network environment 100 via the connected access point device. For associating with an access point device (the first or second access point device 104a or 104b), each wireless client 106 is configured to transmit probe requests to the access point device on various communication bands supported by the corresponding wireless client 106. A probe request is a signal that requests service information about a communication band of the access point device so that a wireless client may determine if it would be preferable to associate with the access point device on the communication band. Based on responses to the probe requests, each wireless client 106 associates with the desired access point device on one of the communication bands supported by the access point device.

In operation, the first access point device 104a receives a probe request from the first wireless client 106a on a non-preferred communication band. The first access point device 104a detects multi-band capability of the first wireless client 106a based on at least a set of parameters included in the received probe request or another probe request received from the first wireless client 106a on the preferred communication band. When the first wireless client 106a is detected to have only single-band capability, the first access point device 104a allows the first wireless client 106a to associate on the non-preferred communication band. However, when the first wireless client 106a is detected to have multi-band capability, the first access point device 104a implements pre-association band steering to steer the first wireless client 106a to the preferred communication band. If pre-association steering is successful, the first wireless client 106a is associated with the first access point device 104a on the preferred communication band; however, if pre-association steering fails, the first access point device 104a allows the first wireless client 106a to associate with the first access point device 104a on the non-preferred communication band. Upon association of the first wireless client 106a on the non-preferred communication band, the first access point device 104a implements post-association steering to steer the first wireless client 106a to the preferred communication band. The first access point device 104a steers the first wireless client 106a to the preferred communication band using at least one of Basic Service Set (BSS) transition method, Extended Channel Switch Announcement (ECSA) method, and force re-connect method. Various operations performed by the first access point device 104a (or the second access point device 104b) to band-steer a wireless client attempting to associate with the first access point device 104a are explained in detail in conjunction with FIGS. 2-5, 6A, and 6B.

Figure 2:
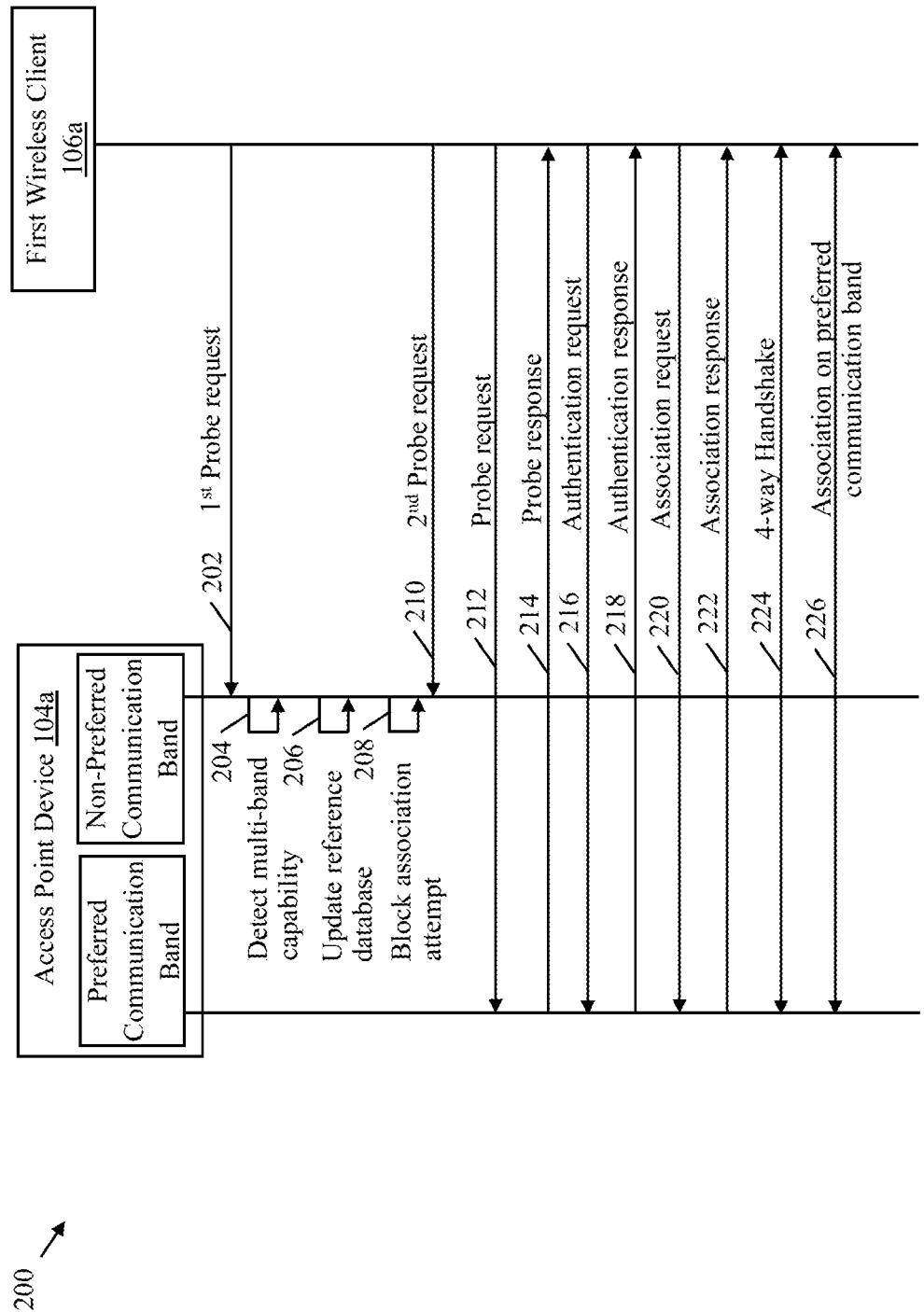
FIG. 2 is a sequence diagram that illustrates band steering of a wireless client by an access point device of FIG. 1, in accordance with an embodiment of the present disclosure.

Referring now to FIG. 2, a sequence diagram 200 that illustrates band steering of the first wireless client 106a by the first access point device 104a, in accordance with an embodiment of the present disclosure is shown. Specifically, FIG. 2 depicts successful pre-association steering performed by the first access point device 104a on the first wireless client 106a, in accordance with an embodiment of the present disclosure.

The first wireless client 106a transmits a probe request to the first access point device 104a on the non-preferred communication band as an attempt to associate with the first access point device 104a on the non-preferred communication band (as shown by arrow 202). The first access point device 104a receives the probe request on the non-preferred communication band and is configured to detect whether the first wireless client 106a has multi-band capability (as shown by WOW 204).

The first access point device 104a detects the multi-band capability of the first wireless client 106a based on a set of parameters included in the received probe request. The set of parameters include various information elements that indicate the multi-band capability. For example, if the received probe request includes information element for very high throughput (VET) capability, the first access point device 104a establishes that the first wireless client 106a has the multi-band capability. In another example, the received probe request may include a vendor specific information element suggesting the first access point device 104a that the first wireless client 106a has the multi-band capability. In yet another example, if linear density parity check is set to true in the received probe request, the first access point device 104a establishes that the first wireless client 106a has the multi-band capability. In a similar manner, there are other information elements and settings known in the art that are included in the probe request and are indicative of the multi-band capability of the wireless clients 106. The first access point device 104a further detects the multi-band capability of the first wireless client 106a based on another probe request received by the first access point device 104a from the first wireless client 106a on the preferred communication band. In a scenario where no probe request is received on the preferred communication band and the probe request that is received does not include the required set of parameters, the first access point device 104a establishes that the first wireless client 106a only has single-band capability and allows the first wireless client 106a to associate with the first access point device 104a on the non-preferred communication band. However, when the first wireless client 106a is detected to have the multi-band capability, the first access point device 104a updates the reference database stored in a corresponding memory to include details of the first wireless client 106a (as shown by arrow 206). The details of the first wireless client 106a include, but are not limited to, band capability information, a unique device identifier, such as the IMEI number, Media Access Control (MAC) address corresponding to the wireless client 106, or any other identifier or address that uniquely identifies the first wireless client 106a.

The first access point device 104a blocks the attempt of the first wireless client 106a to associate with the first access point device 104a on the non-preferred communication band (as shown by arrow 208). The first access point device 104a blocks the attempt by ignoring (or discarding) the received probe request and not communicating a probe response to the first wireless client 106a on the non-preferred communication band.

When the attempt is blocked, the first wireless client 106a communicates another probe request to the first access point device 104a on the non-preferred communication band (as shown by arrow 210). The first access point device 104a determines whether the count of probe requests received from the first wireless client 106a on the non-preferred communication band has exceeded a threshold value. The threshold value is a configurable value that is set to achieve specific system characteristics. When the count of probe requests received from the first wireless client 106a on the non-preferred communication band is less than the threshold value, the first access point, device 104a again ignores the received probe request to block the attempt of the first wireless client 106a to associate on the non-preferred communication band. By blocking the attempt to associate on the non-preferred communication band, the first access point device 104a steers (i.e., pre-association steering) the first wireless client 106a to the preferred communication band.

In one embodiment, before the count of probe requests received on the non-preferred communication band exceeds the threshold value, the first wireless client 106a attempts to associate on the preferred communication band by transmitting another probe request to the first access point device 104a on the preferred communication band (as shown by arrow 212). Upon receiving the probe request on the preferred communication band, the first access point device 104a allows the first wireless client 106a to associate with the first access point device 104a on the preferred communication band. Thus, the first access point device 104a generates and transmits a probe response to the first wireless client 106a on the preferred communication band (as shown by arrow 214). Upon receiving the probe response, the first wireless client 106a communicates an authentication request to the first access point device 104a on the preferred communication band (as shown by arrow 216). The first access point device 104a receives the authentication request and generates an authentication response. The first access point device 104a then transmits the authentication response to the first wireless client 106a on the preferred communication band (as shown by arrow 218). On receiving the authentication response, the first wireless client 106a communicates an association request to the first access point device 104a on the preferred communication band (as shown by arrow 220). The first access point device 104a then generates and transmits an association response to the first wireless client 106a on the preferred communication band (as shown by arrow 222). Based on the association response, the first wireless client 106a and the first access point device 104a performs 4-way handshake (as shown by arrow 224) and the first wireless client 106a associates with the first access point device 104a on the preferred communication band (as shown by arrow 226). Since the first wireless client 106a associates with the first access point device 104a on the preferred communication band, pre-association steering is successful and the first access point device 104a is not required to implement post-association steering.

It will be apparent to a person of ordinary skill in the art that the operations performed by the first access point device 104a may be performed by the second access point device 104b, a controller, a switch, or any other network device, which is capable of wirelessly coupling to the first wireless client 106a and establishing an association with the first wireless client 106a via receiving and responding to probe requests.

Figure 3:
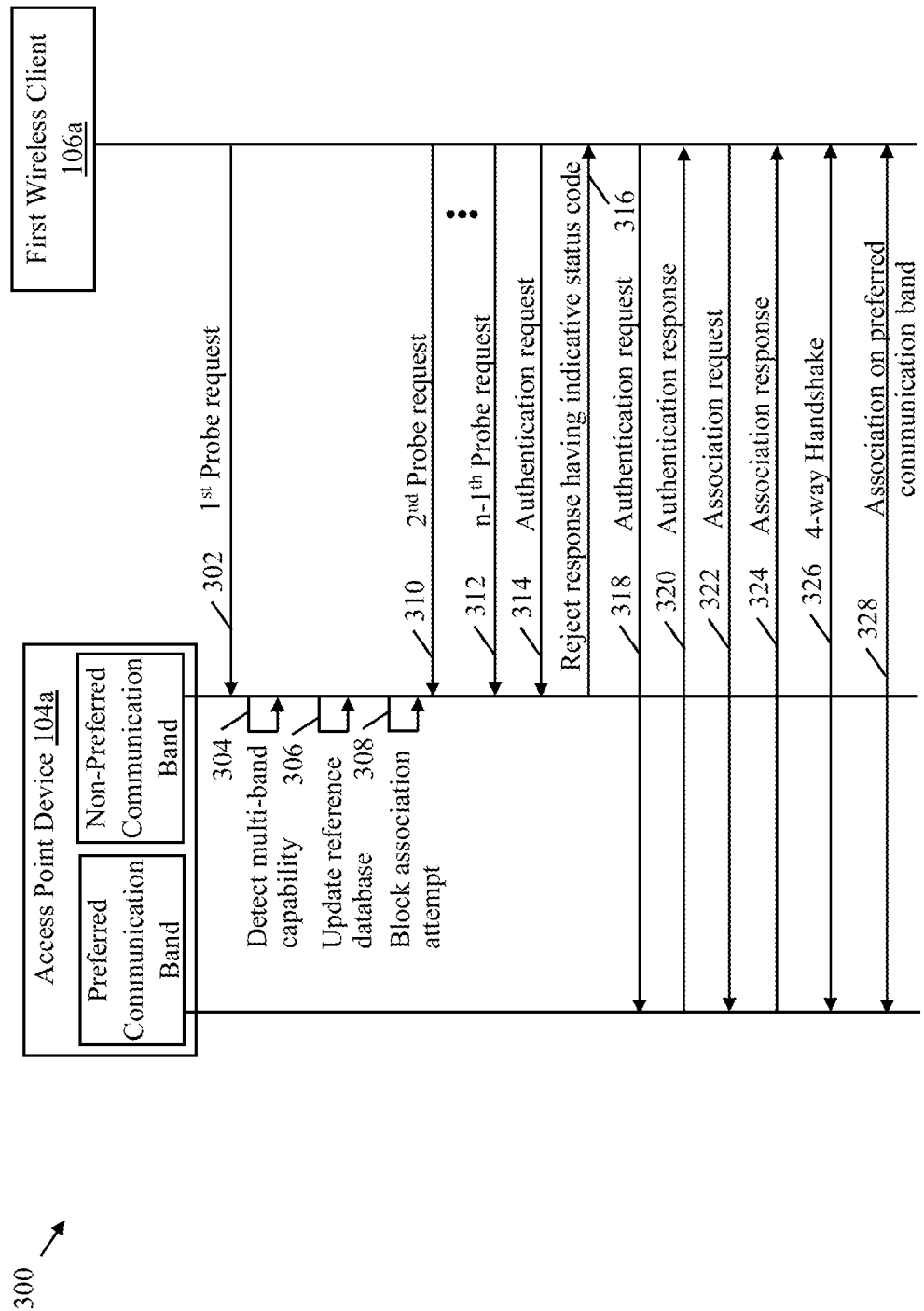
FIG. 3 is a sequence diagram that illustrates band steering of a wireless client by the access point device of FIG. 1, in accordance with another embodiment of the present disclosure.

Referring now to FIG. 3, a sequence diagram 300 that illustrates band steering of the first wireless client 106a by the first access point device 104a, in accordance with another embodiment of the present disclosure is shown. Specifically, FIG. 3 depicts successful pre-association steering performed by the first access point device 104a on the first wireless client 106a, in accordance with another embodiment of the present disclosure.

The first wireless client 106a transmits a probe request to the first access point device 104a on the non-preferred communication band as an attempt to associate with the first access point device 104a on the non-preferred communication band (as shown by arrow 302). The first access point device 104a receives the probe request on the non-preferred communication band and detects whether the first wireless client 106a has multi-band capability (as shown by arrow 304). The first access point device 104a detects the multi-band capability of the first wireless client 106a in a similar manner as described in the foregoing description of FIG. 2. When the first wireless client 106a is detected to have the multi-band capability, the first access point device 104a updates the reference database to include the details of the first wireless client 106a (as shown by arrow 306).

The first access point device 104a then blocks the attempt of the first wireless client 106a to associate with the first access point device 104a on the non-preferred communication band (as shown by arrow 308). The first access point device 104a blocks the attempt by ignoring the received probe request and not communicating a probe response to the first wireless client 106a on the non-preferred communication band. The first wireless client 106a continues to transmit probe requests to the first access point device 104a on the non-preferred communication band (as shown by arrows 310 and 312), and the first access point device 104a continues to block the attempts of the first wireless client 106a to associate with the first access point device 104a on the non-preferred communication band until the count of probe requests on the non-preferred communication band exceeds the threshold value.

However, before the count of probe requests on the non-preferred communication band exceeds the threshold value, the first wireless client 106a communicates an authentication request to the first access point device 104a on the non-preferred communication band (as shown by arrow 314). Based on the received authentication request, the first access point device 104a generates a reject response. The reject response includes an indicative status code to instruct (or indicate) the first wireless client 106a to associate with the first access point device 104a on the preferred communication band. The first access point device 104a then communicates the generated reject response to the first wireless client 106a (as shown by arrow 316).

The first wireless client 106a receives the reject response. Based on the indicative status code in the reject response, the first wireless client 106a transmits an authentication request to the first access point device 104a on the preferred communication band as an attempt to associate on the preferred communication band (as shown by arrow 318). The first access point device 104a receives the authentication request and generates an authentication response. The first access point device 104a then transmits the authentication response to the first wireless client 106a on the preferred communication band (as shown by arrow 320). On receiving the authentication response, the first wireless client 106a communicates an association request to the first access point device 104a on the preferred communication band (as shown by arrow 322). The first access point device 104a then generates and transmits an association response to the first wireless client 106a on the preferred communication band (as shown by arrow 324). Based on the association response, the first wireless client 106a and the first access point device 104a performs 4-way handshake (as shown by arrow 326) and the first wireless client 106a associates with the first access point device 104a on the preferred communication band (as shown by arrow 328). Since the first wireless client 106a associates with the first access point device 104a on the preferred communication band, pre-association steering is successful and the first access point device 104a is not required to implement post-association steering.

Figure 4:
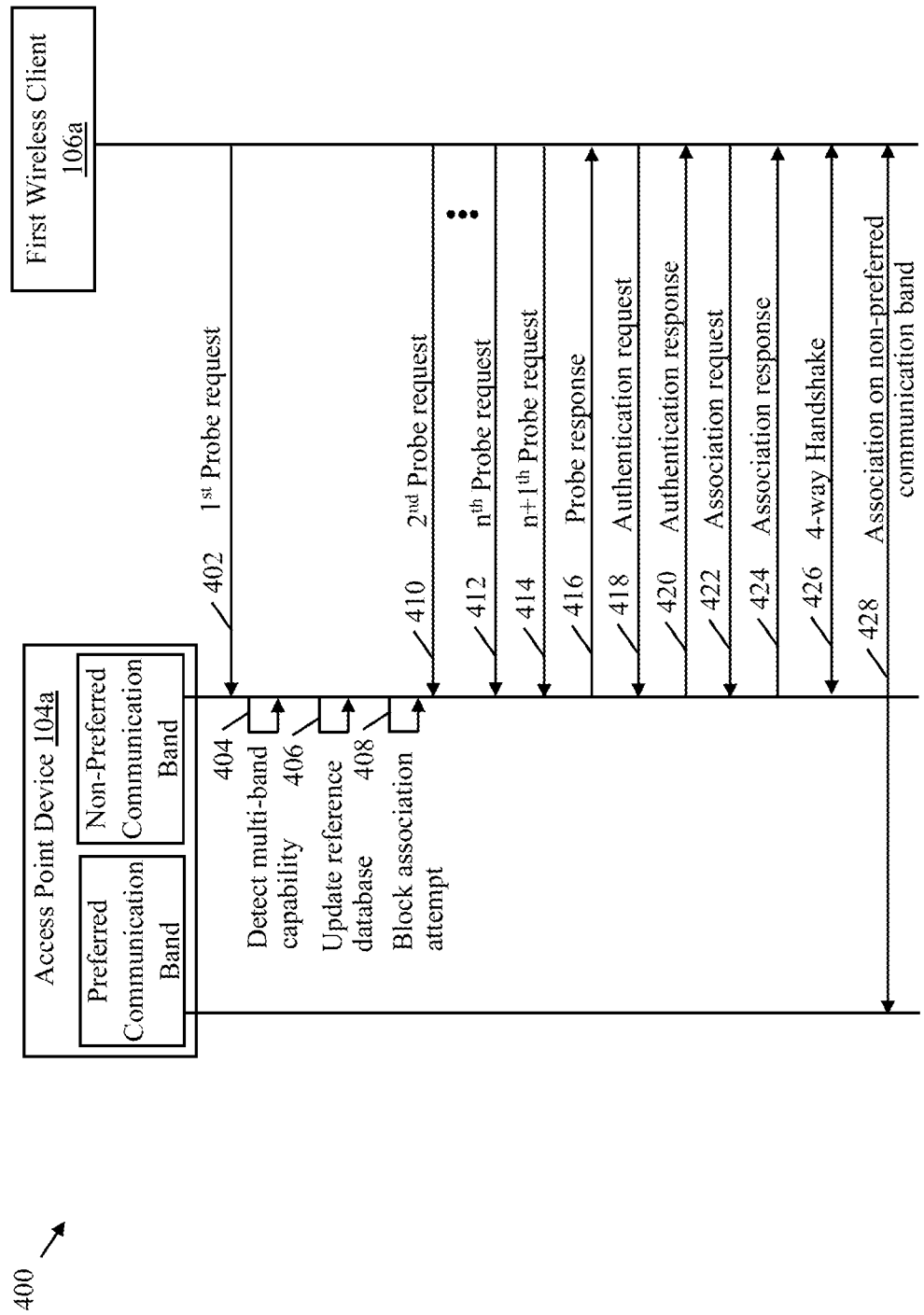
FIG. 4 is a sequence diagram that illustrates band steering of a wireless client by the access point device of FIG. 1, in accordance with yet another embodiment of the present disclosure.

Referring now to FIG. 4, a sequence diagram 400 that illustrates band steering of the first wireless client 106a by the first access point device 104a, in accordance with yet another embodiment of the present disclosure is shown. Specifically, FIG. 4 depicts a failure in pre-association steering performed by the first access point device 104a on the first wireless client 106a, in accordance with yet another embodiment of the present disclosure.

The first wireless client 106a transmits a probe request to the first access point device 104a on the non-preferred communication band as an attempt to associate with the first access point device 104a on the non-preferred communication band (as shown by arrow 402). The first access point device 104a receives the probe request on the non-preferred communication band and detects whether the first wireless client 106a has multi-band capability (as shown by arrow 404). The first access point device 104a detects the multi-band capability of the first wireless client 106a in a similar manner as described in the foregoing description of FIG. 2. When the first wireless client 106a is detected to have the multi-band capability, the first access point device 104a updates the reference database to include the details of the first wireless client 106a (as shown by arrow 406).

The first access point device 104a then blocks the attempt of the first wireless client 106a to associate with the first access point device 104a on the non-preferred communication band (as shown by arrow 408). The first access point device 104a blocks the attempt by ignoring the received probe request and not communicating a probe response to the first wireless client 106a on the non-preferred communication band. In one exemplary scenario, a communication band preferred by the first wireless client 106a may be different from the preferred communication band of the first access point device 104a. For example, the first wireless client 106a may prefer a communication band having maximum signal strength. In a similar manner, there are many other factors known in the art that can affect the preference of the first wireless client 106a. Thus, as per preference, the first wireless client 106a may continue to transmit probe requests to the first access point device 104a on the non-preferred communication band (as shown by arrows 410 and 412). The first access point device 104a continues to block the attempts of the first wireless client 106a to associate with the first access point device 104a on the non-preferred communication band until the count of probe requests on the non-preferred communication band exceeds the threshold value (e.g., 'n'). The first access point device 104a further blocks other attempts (e.g., authentication requests or association requests) of the first wireless client 106a to associate on the non-preferred communication until the count of probe requests on the non-preferred communication band exceeds the threshold value (e.g., 'n').

Thus, when the first access point device 104a receives n+1$^{th}$ probe request from the first wireless client 106a on the non-preferred communication band (as shown by arrow 414), instead of blocking the attempt, the first access point device 104a generates a probe response. The first access point device 104a then transmits the generated probe response to the first wireless client 106a on the non-preferred communication band (as shown by arrow 416), thereby allowing the first wireless client 106a to associate therewith on the non-preferred communication band. Based on the probe response on the non-preferred communication band, the first wireless client 106a communicates an authentication request to the first access point device 104a on the non-preferred communication band (as shown by arrow 418).

The first access point device 104a receives the authentication request and generates an authentication response. The first access point device 104a then transmits the authentication response to the first wireless client 106a on the non-preferred communication band (as shown by arrow 420). On receiving the authentication response, the first wireless client 106a communicates an association request to the first access point device 104a on the non-preferred communication band (as shown by arrow 422). The first access point device 104a then generates and transmits an association response to the first wireless client 106a on the non-preferred communication band (as shown by arrow 424). Based on the association response, the first wireless client 106a and the first access point device 104a performs 4-way handshake (as shown by arrow 426), and the first wireless client 106a associates with the first access point device 104a on the non-preferred communication band (as shown by arrow 428).

Since the first wireless client 106a has associated with the first access point device 104a on the non-preferred communication band, pre-association steering has failed and the first access point device 104a is required to implement post-association steering to steer the associated first wireless client 106a to the preferred communication band. Various operations performed by the first access point device 104a to implement post-association steering on the first wireless client 106a are explained in detail in conjunction with FIGS. 5, 6A, and 6B.

Figure 5:
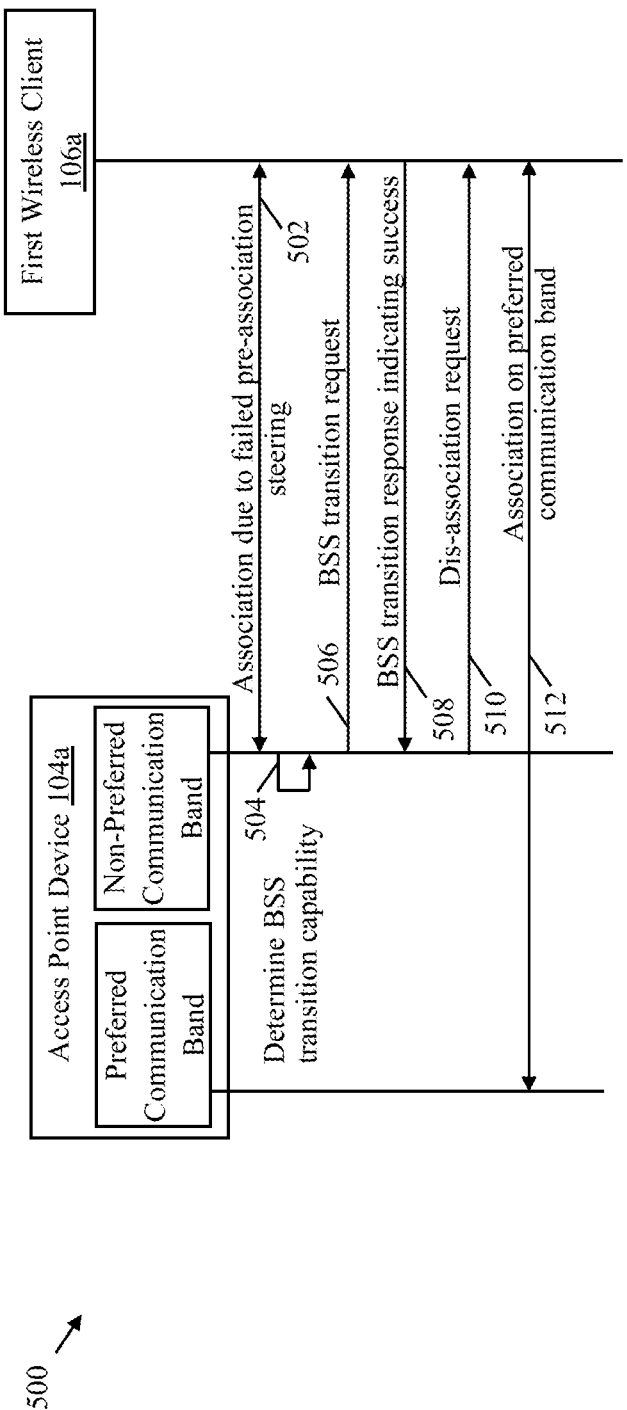
FIG. 5 is a sequence diagram that illustrates band steering of a wireless client by the access point device of FIG. 1, in accordance with yet another embodiment of the present disclosure.

Referring now to FIG. 5, a sequence diagram 500 that illustrates band steering of the first wireless client 106a by the first access point device 104a, in accordance with yet another embodiment of the present disclosure is shown. Specifically, FIG. 5 illustrates post-association steering performed by the first access point device 104a, using the BSS transition method, to steer the associated first wireless client 106a to the preferred communication band.

When the first wireless client 106a is sticky to the non-preferred communication band, the first wireless client 106a ignores all pre-association steering attempts of the first access point device 104a and gets associated with the first access point device 104a on the non-preferred communication band (as shown by arrow 502). Upon association of the multi-band first wireless client 106a on the non-preferred communication band, the first access point device 104a is configured to steer the associated first wireless client 106a to the preferred communication band.

Before steering the associated first wireless client 106a to the preferred communication band, the first access point device 104a determines BSS transition capability of the first wireless client 106a (as shown by arrow 504). A wireless client having the BSS transition capability is capable of fast and secure handoffs from one communication band to another communication band in a seamless manner. When the first wireless client 106a is determined to have the BSS transition capability, the first access point device 104a generates a BSS transition request and transmits it to the first wireless client 106a (as shown by arrow 506). The BSS transition request includes a BSS identifier (BSSID) and a channel number of the preferred communication band. The first wireless client 106a receives the BSS transition request from the first access point device 104a. In one scenario, the first wireless client 106a accepts the BSS transition request and transmits a BSS transition response, indicating an acceptance of the BSS transition request, to the first access point device 104a (as shown by arrow 508). When the BSS transition response indicates success, the first access point device 104a generates and transmits a dis-association request to the first wireless client 106a (as shown by arrow 510). Based on the received dis-association request, the BSSID, and the channel number of the preferred communication band, the first wireless client 106a disassociates from the non-preferred communication band and associates with the preferred communication band (as shown by arrow 512). Association of the first wireless client 106a with the first access point device 104a on the preferred communication band indicates successful post-association steering.

Referring now to FIGS. 6A and 6B, a sequence diagram 600 that illustrates band steering of the first wireless client 106a by the first access point device 104a, in accordance with yet another embodiment of the present disclosure is shown. Specifically, FIG. 6A illustrates post-association steering performed by the first access point device 104a using the ECSA method to steer the associated first wireless client 106a to the preferred communication band.

When the first wireless client 106a is sticky to the non-preferred communication band, the first wireless client 106a ignores all pre-association steering attempts of the first access point device 104a and gets associated with the first access point device 104a on the non-preferred communication band (as shown by arrow 602). The first access point device 104a uses the BSS transition method to steer the associated first wireless client 106a to the preferred communication band. In one embodiment, the BSS transition may be a success and the first wireless client 106a may get associated on the preferred communication band (as depicted in FIG. 5). However, in another embodiment, the first access point device 104a detects a BSS transition failure (as shown by arrow 604). In one example, the BSS transition fails when the first wireless client 106a does not support BSS transition, i.e., the first wireless client 106a does not have the BSS transition capability. In another example, the BSS transition fails when the first wireless client 106a denies the BSS transition request of the first access point device 104a. Upon failure in BSS transition, the first access point device 104a uses the ECSA method to steer the first wireless client 106a to the preferred communication band.

The first access point device 104a generates a channel switch announcement and transmits it to the first wireless client 106a (as shown by arrow 606). By way of the channel switch announcement, the first access point device 104a notifies the associated first wireless client 106a of its intention to switch the association from the non-preferred communication band to the preferred communication band. In one embodiment, the first wireless client 106a accepts the channel switch announcement and transmits a positive response to the first access point device 104a (as shown by arrow 608A). The first access point device 104a dynamically switches the first wireless client 106a from the non-preferred communication band to the preferred communication band, and thus, the first wireless client 106a associates with the first access point device 104a on the preferred communication band (as shown by arrow 610).

Specifically, FIG. 6B illustrates post-association steering performed by the first access point device 104a using the force re-connect method to steer the associated first wireless client 106a to the preferred communication band. In another embodiment, the first wireless client 106a denies the channel switch announcement and transmits a negative response to the first access point device 104a (as shown by arrow 608B). Upon receiving the negative response to the channel switch announcement, the first access point device 104a terminates the association of the first wireless client 106a on the preferred communication band (as shown by arrow 612). Based on the termination of the association, the first access point device 104a generates and transmits a de-authentication request to the first wireless client 106a (as shown by arrow 614). The de-authentication request includes the indicative status code to instruct (or indicate) the first wireless client 106a to associate with the first access point device 104a on the preferred communication band. In one embodiment, the first wireless client 106a associates with the first access point device 104a on the preferred communication band based on the de-authentication request (as shown by arrow 616). However, in another embodiment, the first wireless client 106a ignores the de-authentication request. In such embodiments, the first access point device 104a attempts the force re-connect method for a configured number of times (e.g., 3 times, 4 times, or the like), after which the first access point device 104a allows the first wireless client 106a to remain associated on the non-preferred communication band.

It will be apparent to those of skill in the art that the communication band preferred by the first access point device 104a is not fixed and may change upon association of the first wireless client 106a with the first access point device 104a. Thus, the first access point device 104a dynamically implements post-association steering to steer the multi-band first wireless client 106a to that communication band which is preferred by the first access point device 104a at that current time instant.

Referring now to FIG. 7, a schematic block diagram of the first access point device 104a, in accordance with an embodiment of the present disclosure is shown. The first access point device 104a includes a memory 702, first and second wireless network interfaces 704a and 704b, and processing circuitry 706.

The memory 702 is configured to store various instructions that when executed by the processing circuitry 706 cause the processing circuitry 706 to perform band steering operations as described in the foregoing description of FIGS. 2-5, 6A, and 6B. The instructions stored in the memory 702 are pursuant to various standards and protocols (e.g., IEEE 802.11) set forth for wireless communication. The memory 702 is further configured to store a specialized operating system or firmware for managing the hardware of the first access point device 104a. The memory 702 is further configured to store the reference database (hereinafter, referred to and designated as "the reference database 708") that includes the record of various multi-band or single band wireless clients that have previously connected to the first access point device 104a. The reference database 708 is further indicative of band capability of the wireless clients that have previously connected to the first access point device 104a. Band capability of a wireless client indicates whether the wireless client supports operation on multiple communication bands or a single communication band. Examples of the memory 702 include, but are not limited to, a Solid State Drive (SSD), a Random Access Memory (RAM), a Read Only Memory (ROM), a Hard Disk Drive (HDD), a flash memory, and a removable storage device.

The first and second wireless network interfaces 704a and 704b are configured to wirelessly communicate with the wireless clients 106. Each wireless network interface 704a and 704b operates on at least one of the communication bands supported by the first access point device 104a. For example, the first wireless network interface 704a operates on the 2G band and the second wireless network interface 704b operates on both the 2G and 5G bands. The first and second wireless network interfaces 704a and 704b are configured to transmit data on various channels associated with their corresponding communication bands. Examples of the first and second wireless network interfaces 704a and 704b include, but are not limited to, wireless IEEE 802.11 interface, wireless WiMAX interface, cellular wireless interface, satellite transmission interface, or any other wireless interface for coupling the wireless clients 106. It will be apparent to those of skill in the art that the scope of the first access point device 104a is not limited to include two wireless network interfaces, and may include any number of wireless network interfaces without deviating from the scope of disclosure.

The processing circuitry 706 is coupled to the memory 702 and the first and second wireless network interfaces 704a and 704b, and is configured to execute the instructions stored in the memory 702 to perform various multi-band capability detection and band steering operations, as explained in conjunction with FIGS. 2-5, 6A, and 6B. For example, the processing circuitry 706 is configured to receive probe requests from the wireless clients 106. When a probe request is received from a wireless client (e.g., the first wireless client 106a) on the non-preferred communication band, the processing circuitry 706 is configured to detect the multi-band capability of the corresponding wireless client 106 by analyzing the received probe request. The processing circuitry 706 further refers to the reference database 708 to detect the multi-band capability of the wireless client if the wireless client had previously connected to the first access point device 104a. When the wireless client does not have the multi-band capability, the processing circuitry 706 is configured to allow the wireless client to associate on the non-preferred communication band. However, when the wireless client is detected to have the multi-band capability, the processing circuitry 706 is configured to update the reference database 708 and block all attempts of the wireless client to associate on the non-preferred communication band, until a count of probe requests received from the wireless client on the non-preferred communication band exceeds the threshold value.

The processing circuitry 706 is further configured to allow the wireless client having the multi-band capability to associate on the non-preferred communication band when the count of probe requests received from the wireless client on the non-preferred communication band exceeds the threshold value. The processing circuitry 706 is further configured to allow the wireless client having the multi-band capability to associate on the preferred communication band when the wireless client attempts to associate on the preferred communication, band before the count of probe requests from the wireless client on the non-preferred communication band exceeds the threshold value. Upon failure in pre-association steering, the processing circuitry 706 is further configured to implement post-association steering as described in conjunction with FIGS. 5, 6A, and 6B. The processing circuitry 706 is configured to use at least one of the BSS transition method (depicted in FIG. 5), the ECSA method (depicted in FIG. 6A), and the force re-connect method (depicted in FIG. 6B) to implement post-association steering. Examples of the processing circuitry 706 include, but are not limited to, a microcontroller, a microprocessor, an application specific integrated circuit (ASIC) processor, a reduced instruction set computer (RISC) processor, a complex instruction set computer (CISC) processor, and a field programmable gate array (FPGA).

It will be apparent to a person of ordinary skill in the art that the second access point device 104b, a controller, a switch, or any other network device, which is capable of wirelessly coupling to the first wireless client 106a and establishing an association with the first wireless client 106a via receiving and responding to probe requests may be structurally similar to the first access point device 104a.

Figure 8A:
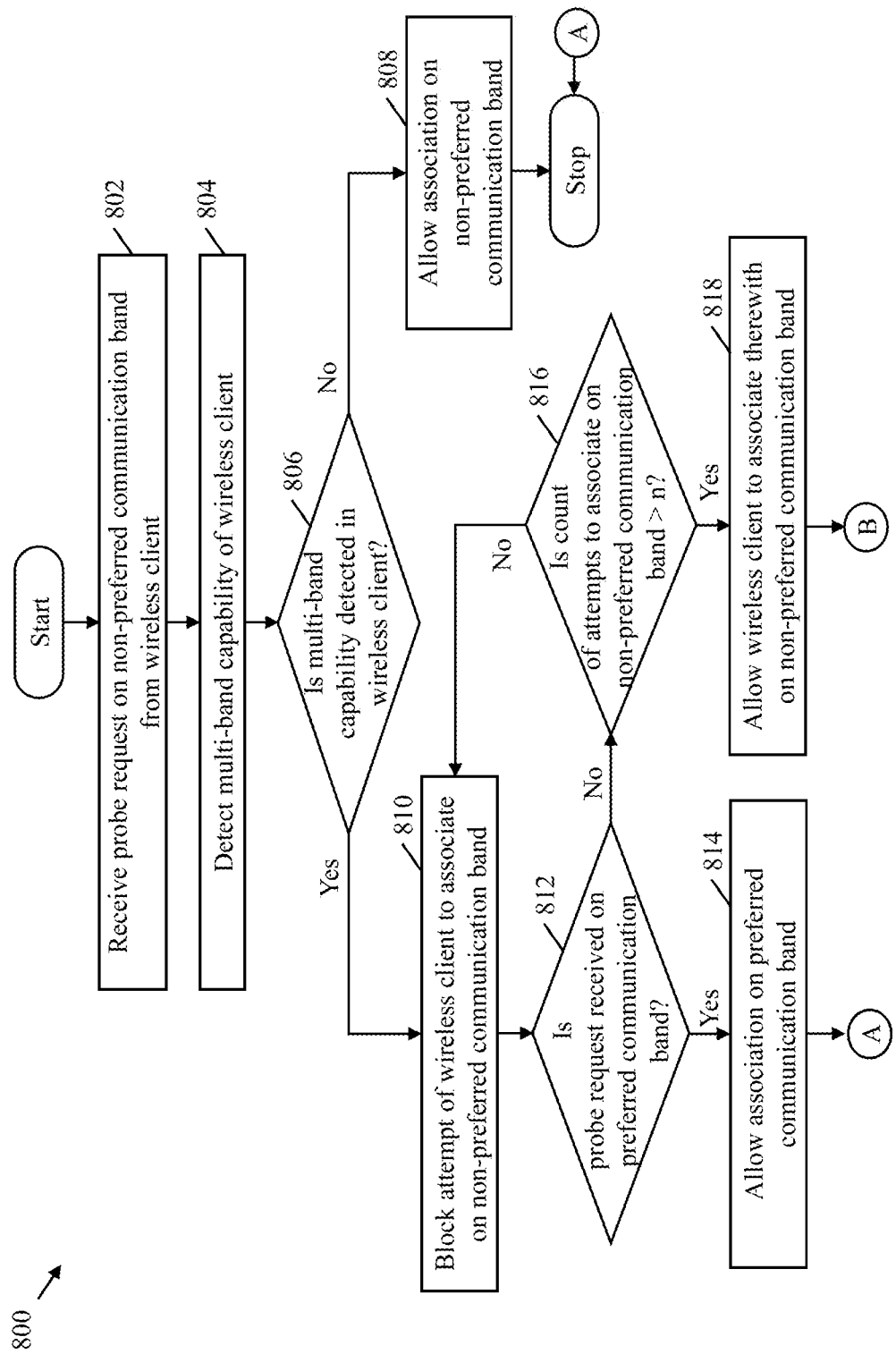
FIGS. 8A and 8B, collectively represent a flow chart that illustrates a method for band steering a multi-band wireless client by the access point device of FIG. 1, in accordance with an embodiment of the present disclosure.
Figure 8B:
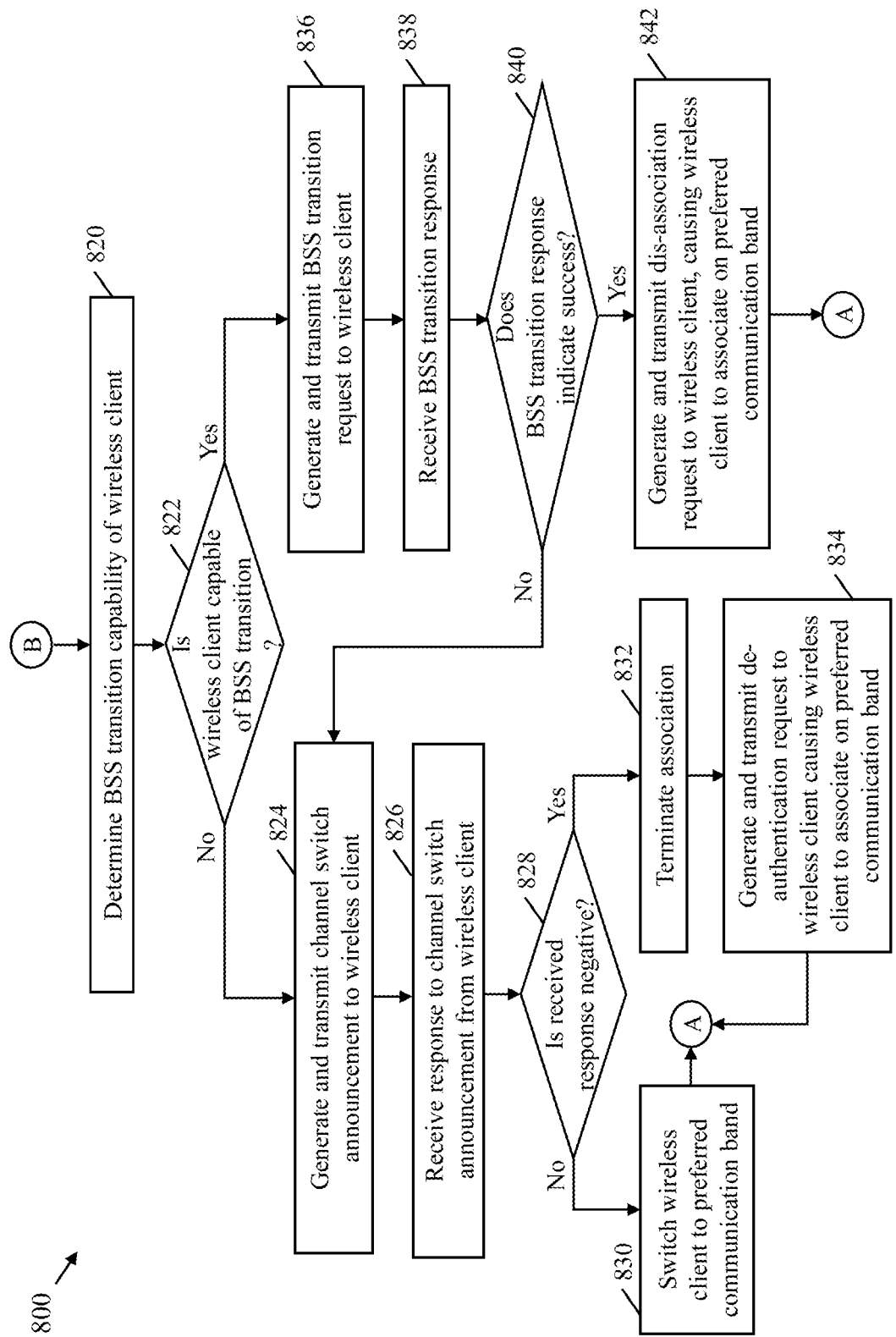

Referring now to FIGS. 8A and 8B, a flow chart 800 illustrating a method for band steering a wireless client by an access point device, in accordance with an embodiment of the present disclosure is shown. For the sake of brevity, the flow chart 800 is described with reference to the first access point device 104a and the first wireless client 106a.

At step 802, the first access point device 104a is configured to receive a probe request from the first wireless client 106a on the non-preferred communication band. At step 804, the first access point device 104a is configured to detect the multi-band capability of the first wireless client 106a that has attempted to associate on the non-preferred communication band by transmitting the probe request on the non-preferred communication band. Various operations performed by the first access point device 104a to detect the multi-band capability are described later in conjunction with FIG. 9.

At step 806, the first access point device 104a is configured to determine whether the multi-band capability is detected in the first wireless client 106a. If at step 806, the first access point device 104a determines that the first wireless client 106a does not have the multi-band capability, step 808 is executed. At step 808, the first access point device 104a allows the first wireless client 106a to associate with the first access point device 104a on the non-preferred communication band and process stops.

If at step 806, the first access point device 104a determines that the first wireless client 106a has the multi-band capability, step 810 is executed. At step 810, the first access point device 104a is configured to block the attempt of the first wireless client 106a to associate with the first access point device 104a on the non-preferred communication band. At step 812, the first access point device 104a is configured to determine whether any probe request is received from the first wireless client 106a on the preferred communication band. If at step 812, the first access point device 104a determines that a probe request is received from the first wireless client 106a on the preferred communication band, step 814 is executed. At step 814, the first access point device 104a is configured to allow the first wireless client 106a to associate with the first access point device 104a on the preferred communication band and the process stops.

If at step 812, the first access point device 104a determines that no probe request is received from the first wireless client 106a on the preferred communication band, step 816 is executed. At step 816, the first access point, device 104a is configured to determine whether the count of probe requests received from the first wireless client 106a on the non-preferred communication band has exceeded the threshold value. If at step 816, the first access point device 104a determines that the count of probe requests received from the first wireless client 106a on the non-preferred communication band is less than the threshold value, step 810 is executed. If at step 816, the first access point device 104a determines that the count of probe requests received from the first wireless client 106a on the non-preferred communication band has exceeded the threshold value, step 818 is executed. At step 818, the first access point device 104a is configured to allow the first wireless client 106a to associate on the non-preferred communication band. The first access point device 104a allows the first wireless client 106a by transmitting a probe response on the non-preferred communication band.

At step 820, the first access point device 104a is configured to determine the BSS transition capability of the first wireless client 106a that is associated with the first access point device 104a on the non-preferred communication band, for steering the first wireless client 106a to the preferred communication band. At step 822, the first access point device 104a is configured to determine whether the first wireless client 106a has the BSS transition capability. If at step 822, the first access point device 104a determines that the first wireless client 106a does not have the BSS transition capability, step 824 is executed. At step 824, the first access point device 104a is configured to generate and transmit the channel switch announcement to the first wireless client 106a. At step 826, the first access point device 104a receives a response to the channel switch announcement from the first wireless client 106a. At step 828, the first access point device 104a is configured to determine whether the received response is negative. If at step 828, the first access point device 104a determines that the received response is positive, step 830 is executed. At step 830, the first access point device 104a is configured to switch the first wireless client 106a from the non-preferred communication band to the preferred communication band.

If at step 828, the first access point device 104a determines that the received response is negative, step 832 is executed. At step 832, the first access point device 104a is configured to terminate the association between the first access point device 104a and the first wireless client 106a. At step 834, the first access point device 104a is configured to transmit the de-authentication request, including the indicative status code, to the first wireless client 106a to cause the first wireless client 106a to associate (or re-connect) on the preferred communication band and the process stops. The first access point device 104a attempts the force re-connect method for a configured number of times (e.g., 3 times, 4 times, or the like), after which the first access point device 104a allows the first wireless client 106a to remain connected on the non-preferred communication band.

If at step 822, the first access point device 104a determines that the first wireless client 106a has the BSS transition capability, step 836 is executed. At step 836, the first access point device 104a is configured to generate and transmit the BSS transition request to the first wireless client 106a. The BSS transition request includes the BSSID and the channel number of the preferred communication band. At step 838, the first access point device 104a receives the BSS transition response from the first wireless client 106a. At step 840, the first access point device 104a is configured to determine whether the BSS transition response received from the first wireless client 106a indicates BSS transition success. If at step 840, the first access point device 104a determines the BSS transition response indicates BSS transition failure, step 824 is executed. If at step 840, the first access point device 104a determines the BSS transition response indicates BSS transition success, step 842 is executed. At step 842, the first access point device 104a is configured to generate and transmit the dis-association request to the first wireless client 106a, causing the first wireless client 106a to associate with the first access point device 104a on the preferred communication band and the process stops.

Figure 9:
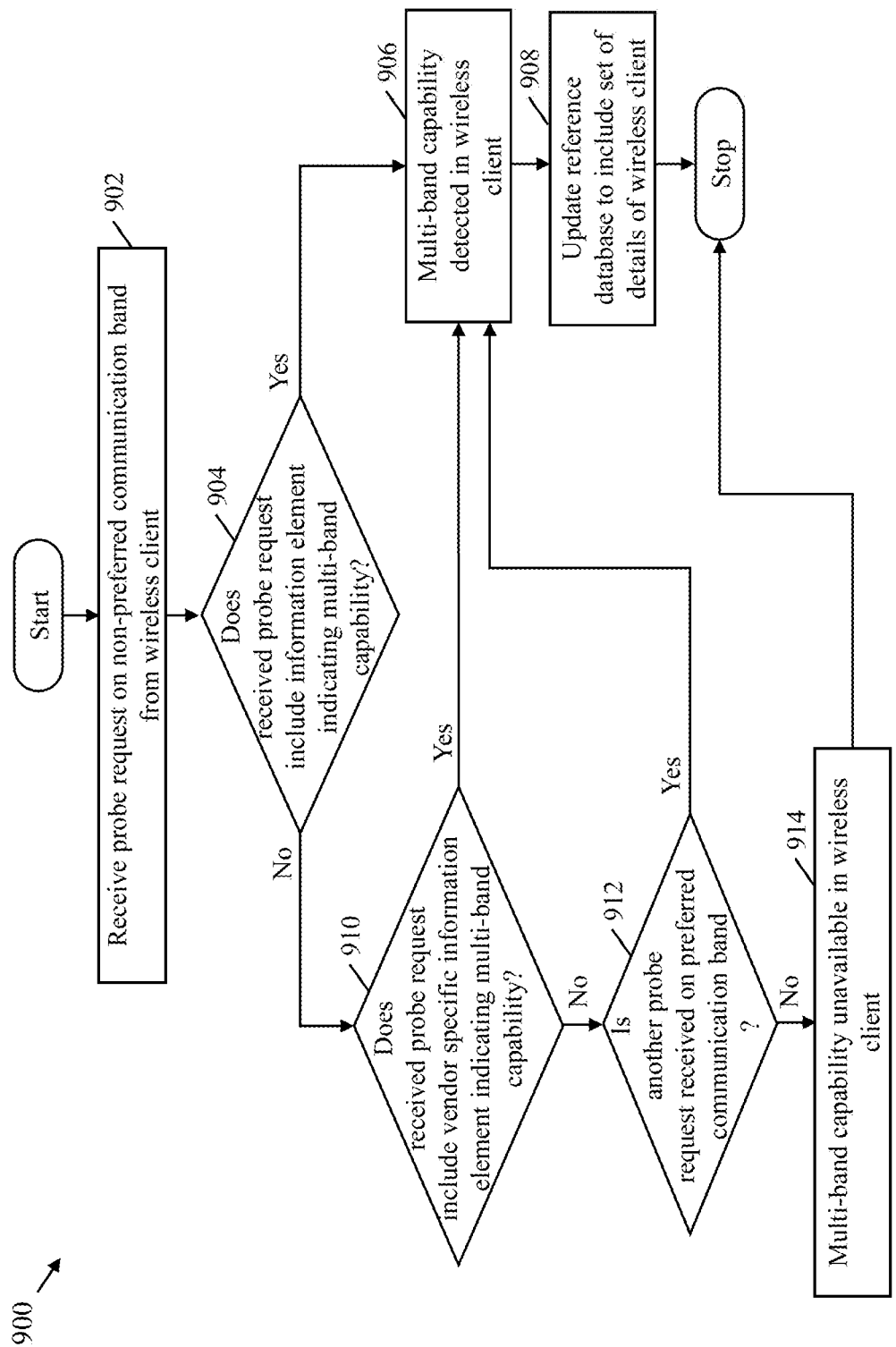
FIG. 9 is a flow chart that illustrates a method for detecting multi-band capability of a wireless client by the access point device of FIG. 1, in accordance with an embodiment of the present disclosure.

Referring now to FIG. 9, a flow chart 900 that illustrates a method for detecting multi-band capability of a wireless client by an access point device, in accordance with, an embodiment of the present disclosure is shown. For the sake of brevity, the flow chart 900 is described with reference to the first access point device 104a and the first wireless client 106a.

At step 902, the first access point device 104a receives a probe request from the first wireless client 106a on the non-preferred communication band. At step 904, the first access point device 104a is configured to determine whether the probe request includes a setting or an information element that indicates the multi-band capability in the first wireless client 106a. If at step 904, the first access point device 104a determines that the probe request includes at least one such setting or information element that indicates the multi-band capability, step 906 is executed. At step 906, the first access point device 104a is configured to establish that the first wireless client 106a has the multi-band capability. At step 908, the first access point device 104a is configured to update the reference database 708 stored in the memory 702 to include the details of the first wireless client 106a and the detection process stops.

If at step 904, the first access point device 104a determines that the probe request does not include any setting or information element that indicates the multi-band capability, step 910 is executed. At step 910, the first access point device 104a is configured to determine whether the received probe request includes any vendor specific information element that indicates the multi-band capability in the first wireless client 106a. If at step 910, the first access point device 104a determines that the received probe request includes at least one vendor specific information element indicating the multi-band capability, step 906 is executed. If at step 910, the first access point device 104a determines that the received probe request includes no such vendor specific information element indicating the multi-band capability, step 912 is executed. At step 912, the first access point device 104a is configured to determine whether any other probe request is received from the first wireless client 106a on the preferred communication band. If at step 912, the first access point device 104a determines that a probe request is received from the first wireless client 106a on the preferred communication band, step 906 is executed. If at step 912, the first access point device 104a determines that no probe request is received from the first wireless client 106a on the preferred communication band, step 914 is executed. At step 914, the first access point device 104a is configured to establish that the multi-band capability is unavailable in the first wireless client 106a and the detection process stops.

Technological improvements in the first and second access point devices 104a and 104b enable the first and second access point devices 104a and 104b to detect multi-band capability of new wireless clients based on received probe requests. Since the first and second access point devices 104a and 104b detect the multi-band capability before implementing band steering, single-band capable wireless clients do not experience delay caused due to band steering during initial association. Further, the first and second access point devices 104a and 104b only block a specific count of probe requests received from each wireless client on the non-preferred communication band, after which the multi-band wireless clients are allowed to associate on the non-preferred communication band. Thus, no wireless client is denied connection to the first or second access point device 104a or 104b due to band steering. Upon association on the non-preferred communication band, the first and second access point devices 104a and 104b implement post-association steering to steer the already associated multi-band wireless clients to the preferred communication band, thereby efficiently managing its bandwidth.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

The invention claimed is:

1. An access point device operable in a wireless network, the access point device comprising:
  processing circuitry configured to:
    detect multi-band capability of a first wireless client that attempts to associate on a non-preferred communication band of the access point device by transmitting a first probe request to the access point device on the non-preferred communication band, wherein the processing circuitry detects the multi-band capability of the first wireless client based on a set of parameters included in the first probe request; block the attempt of the first wireless client to associate on the non-preferred communication band based on the detected multi-band capability of the first wireless client;
    allow the first wireless client to associate with the access point device on one of the non-preferred communication band and a preferred communication band of the access point device based on a count of probe requests received by the processing circuitry from the first wireless client on the non-preferred communication band;
    while being associated with the first wireless client on the non-preferred communication band, determining via the non-preferred communication band a Basic Service Set (BSS) transition capability of the first wireless client associated with the access point device; and steering the first wireless client to the preferred communication band of the access point device based on the BSS transition capability;
    transmit, based on a failure in the BSS transition or the first wireless client not having the BSS transition capability, an extended channel switch announcement (ECSA) to the first wireless client; receive a negative response to the extended channel switch announcement from the first wireless client, send a de-authentication request to the first wireless device to force a re-connect of the first wireless client on the preferred communication band in response to the negative response to the extended channel switch announcement,
    wherein if the first wireless client does not associate on the preferred communication band after a configured number of attempts to force the re-connect, allowing the first wireless client to remain connected to the non-preferred band, wherein the attempts are performed after the negative response to the extended channel switch announcement and to one or more de-authentication requests, and after the first wireless client was associated with the access point on the non-preferred band; and
    in response to determining that the set of parameters included in the first probe request does not indicate that the first wireless client has multi-band capability, allowing the first wireless client to associate with the access point on the non-preferred communication band.

2. The access point device of claim 1, wherein the processing circuitry is configured to allow the first wireless client, having the multi-band capability, to associate with the access point device on:
  the non-preferred communication band when the count of probe requests received by the processing circuitry from the first wireless client on the non-preferred communication band exceeds a threshold value, and
  the preferred communication band when the first wireless client attempts to associate on the preferred communication band before the count of probe requests received by the processing circuitry from the first wireless client on the non-preferred communication band exceeds the threshold value.

3. The access point device of claim 1 wherein the processing circuitry is further configured to:
  generate a BSS transition request for transmitting to the first wireless client, when the BSS transition capability is determined for the first wireless client, wherein the BSS transition request includes a BSS identifier (BSSID) and a channel number of the preferred communication band;
  receive, from the first wireless client, a BSS transition response based on the BSS transition request; and
  generate a dis-association request based on the BSS transition response for transmitting to the first wireless client, wherein based on the dis-association request, the BSSID, and the channel number, the first wireless client is disassociated from the non-preferred communication band and associated with the preferred communication band.

4. The access point device of claim 1, wherein the processing circuitry is further configured to switch the first wireless client from the non-preferred communication band to the preferred communication band based on a positive response to the extended channel switch announcement.

5. The access point device of claim 1, further comprising a memory that is coupled with the processing circuitry and configured to store a reference database that includes a record of a second plurality of wireless clients that are multi-band capable and have previously connected to the access point device, wherein the processing circuitry is further configured to:
  update the reference database to include a set of details of the first wireless client based on the detection of the multi-band capability of the first wireless client.

6. The access point device of claim 1, wherein the processing circuitry is further configured to:
  receive an authentication request on the non-preferred communication band from the first wireless client that is detected with the multi-band capability, wherein the authentication request is received before the count of probe requests received by the processing circuitry from the first wireless client on the non-preferred communication band exceeds a threshold value; and
  generate a reject response based on the authentication request for transmitting to the first wireless client, wherein the reject response includes an indicative status code that indicates the first wireless client to associate on the preferred communication band.

7. The access point device of claim 1, wherein the processing circuitry detects the multi-band capability of the first wireless client further based on a second probe request received by the access point device from the first wireless client on the preferred communication band, and wherein the set of parameters include at least one of a first information element that indicates a capability of the first wireless client to associate on the preferred communication band and a second information element that is vendor specific and indicates that the first wireless client has the multi-band capability.

8. The access point of claim 1, wherein a parity check in the set of parameters is set to false to indicate that the first wireless client does not have multi-band capability.

9. A method for band steering in a wireless network, the method comprising:
  detecting, by an access point device, multi-band capability of a first wireless client that attempts to associate on a non-preferred communication band of the access point device by transmitting a first probe request to the access point device on the non-preferred communication band, wherein the multi-band capability of the first wireless client is detected based on a set of parameters included in the first probe request; blocking, by the access point device, the attempt of the first wireless client to associate on the non-preferred communication band based on the detected multi-band capability of the first wireless client;

allowing, by the access point device, the first wireless client to associate with the access point device on one of the non-preferred communication band and a preferred communication band of the access point device based on a count of probe requests received by the access point device from the first wireless client on the non-preferred communication band;

while being associated with the first wireless client on the non-preferred communication band, determining via the non-preferred communication band a Basic Service Set (BSS) transition capability of the first wireless client associated with the access point device; and steering the first wireless client to the preferred communication band of the access point device based on the BSS transition capability;

transmit, based on a failure in the BSS transition or the first wireless client not having the BSS transition capability, an extended channel switch announcement (ECSA) to the first wireless client; receive a negative response to the extended channel switch announcement from the first wireless client, send a de-authentication request to the first wireless device to force a re-connect of the first wireless client on the preferred communication band in response to the negative response to the extended channel switch announcement, wherein if the first wireless client does not associate on the preferred communication band after a configured number of attempts to force the re-connect, allowing the first wireless client to remain connected to the non-preferred band, wherein the attempts are performed after the negative response to the extended channel switch announcement and to one or more de-authentication requests, and after the first wireless client was associated with the access point on the non-preferred band; and in response to determining that the set of parameters included in the first probe request does not indicate that the first wireless client has multi-band capability, allowing the first wireless client to associate with the access point on the non-preferred communication band.

10. The method of claim 9, wherein the access point device allows the first wireless client, having the multi-band capability, to associate with the access point device on:

the non-preferred communication band when the count of probe requests received by the access point device from the first wireless client on the non-preferred communication band exceeds a threshold value, and the preferred communication band when the first wireless client attempts to associate on the preferred communication band before the count of probe requests received by the access point device from the first wireless client on the non-preferred communication band exceeds the threshold value.

11. The method of claim 9, further comprising:
generating, by the access point device, a BSS transition request for transmitting to the first wireless client, when the BSS transition capability is determined for the first wireless client, wherein the BSS transition request includes a BSS identifier (BSSID) and a channel number of the preferred communication band;

receiving, by the access point device, from the first wireless client, a BSS transition response based on the BSS transition request; and generating, by the access point device, a dis-association request based on the BSS transition response for transmitting to the first wireless client, wherein based on the dis-association request, the BSSID, and the channel number, the first wireless client is disassociated from the non-preferred communication band and is associated with the preferred communication band.

12. The method of claim 9, further comprising:
generating, by the access point device, based on a failure in BSS transition, flan11 the extended channel switch announcement for transmitting to the first wireless client; and receiving, by the access point device, one of a positive response and a negative response to the extended channel switch announcement from the first wireless client.

13. The method of claim 12, further comprising switching, by the access point device, the first wireless client from the non-preferred communication band to the preferred communication band based on the positive response.

14. The method of claim 9, further comprising:
storing, by the access point device, in a corresponding memory, a reference database that includes a record of a second plurality of wireless clients that are multi-band capable and have previously connected to the access point device; and updating, by the access point device, the reference database to include a set of details of the first wireless client based on the detection of the multi-band capability of the first wireless client.

15. The method of claim 9, further comprising:
receiving, by the access point device, an authentication request on the non-preferred communication band from the first wireless client that is detected with the multi-band capability, wherein the authentication request is received before the count of probe requests received by the access point device from the first wireless client on the non-preferred communication band exceeds a threshold value; and generating, by the access point device, a reject response based on the authentication request for transmitting to the first wireless client, wherein the reject response includes an indicative status code that indicates the first wireless client to associate on the preferred communication band.

16. The method of claim 9, wherein the multi-band capability of the first wireless client is further detected based on a second probe request received by the access point device from the first wireless client on the preferred communication band, and wherein the set of parameters include at least one of a first information element that indicates a capability of the first wireless client to associate on the preferred communication band and a second information element that is vendor specific and indicates that the first wireless client has the multi-band capability.

17. The method of claim 9, wherein a parity check in the set of parameters is set to false to indicate that the first wireless client does not have multi-band capability.

* * * * *